(12) United States Patent
Porras et al.

(10) Patent No.: US 10,384,511 B2
(45) Date of Patent: Aug. 20, 2019

(54) METHOD TO CONTROL BATTERY COOLING USING THE BATTERY COOLANT PUMP IN ELECTRIFIED VEHICLES

(71) Applicant: Ford Global Technologies, LLC, Dearborn, MI (US)

(72) Inventors: Angel Fernando Porras, Dearborn, MI (US); Timothy Noah Blatchley, Dearborn, MI (US); Kenneth J. Jackson, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 15/417,260

(22) Filed: Jan. 27, 2017

(65) Prior Publication Data

US 2018/0215231 A1 Aug. 2, 2018

(51) Int. Cl.
| | | |
|---|---|---|
| *B60H 1/00* | (2006.01) | |
| *B60L 1/02* | (2006.01) | |
| *B60H 1/32* | (2006.01) | |
| *B60L 11/18* | (2006.01) | |
| *B60L 1/00* | (2006.01) | |
| *B60L 58/26* | (2019.01) | |

(52) U.S. Cl.
CPC ..... *B60H 1/00278* (2013.01); *B60H 1/00885* (2013.01); *B60H 1/323* (2013.01); *B60H 1/3204* (2013.01); *B60H 1/3205* (2013.01); *B60H 1/32281* (2019.05); *B60L 1/003* (2013.01); *B60L 1/02* (2013.01); *B60L 58/26* (2019.02); *B60H 1/00385* (2013.01); *B60H 2001/00307* (2013.01); *B60H 2001/3255* (2013.01); *B60H 2001/3266* (2013.01); *B60H 2001/3272* (2013.01); *B60L 2240/36* (2013.01); *B60L 2240/545* (2013.01); *Y02T 10/7005* (2013.01); *Y02T 90/16* (2013.01); *Y10S 903/93* (2013.01)

(58) Field of Classification Search
CPC combination set(s) only.
See application file for complete search history.

(56) References Cited

U.S. PATENT DOCUMENTS

| | | | |
|---|---|---|---|
| 4,616,484 A | 10/1986 | Mehdi et al. | |
| 8,887,843 B2 | 11/2014 | Piccard et al. | |
| 9,016,080 B2 | 4/2015 | Brodie et al. | |
| 2004/0069546 A1* | 4/2004 | Lou | B60K 6/22 180/65.21 |
| 2008/0271937 A1 | 11/2008 | King et al. | |

(Continued)

FOREIGN PATENT DOCUMENTS

WO 2016077559 A1 5/2016

*Primary Examiner* — Kaity V Chandler
(74) *Attorney, Agent, or Firm* — David Kelley; Brooks Kushman P.C.

(57) ABSTRACT

A climate-control system for a vehicle, comprising a controller in communication with a chiller configured to cool a vehicle battery and an evaporator configured to cool a vehicle cabin. The controller is configured to output a target chiller-pump speed based upon a difference between a battery coolant temperature and a target-battery coolant temperature to mitigate a temperature swing of air entering the cabin, and limiting the target chiller-pump speed in response to an available capacity of the chiller.

7 Claims, 5 Drawing Sheets

(56) References Cited

U.S. PATENT DOCUMENTS

| | | | |
|---|---|---|---|
| 2010/0012295 A1* | 1/2010 | Nemesh | B60H 1/00278 165/104.19 |
| 2011/0091750 A1* | 4/2011 | Claypole | H01M 10/6569 429/50 |
| 2012/0234518 A1* | 9/2012 | Brodie | B60H 1/00278 165/104.31 |
| 2012/0297809 A1* | 11/2012 | Carpenter | B60L 1/003 62/244 |
| 2013/0061627 A1* | 3/2013 | Neumeister | B60L 1/003 62/467 |
| 2013/0269911 A1* | 10/2013 | Carpenter | F28D 1/0408 165/104.13 |
| 2013/0280564 A1* | 10/2013 | Zheng | H01M 2/1077 429/62 |
| 2014/0096547 A1 | 4/2014 | Boehde | |
| 2014/0096550 A1* | 4/2014 | Gao | B60L 58/27 62/115 |
| 2014/0193683 A1* | 7/2014 | Mardall | H01M 2/1077 429/99 |
| 2014/0305153 A1* | 10/2014 | Arai | H05K 7/20936 62/190 |
| 2014/0326430 A1* | 11/2014 | Carpenter | B60L 58/26 165/41 |
| 2014/0338376 A1 | 11/2014 | Carpenter et al. | |
| 2015/0013367 A1* | 1/2015 | Carpenter | B60H 1/00278 62/222 |
| 2015/0202986 A1* | 7/2015 | Hatakeyama | B60H 1/22 165/287 |
| 2015/0217623 A1* | 8/2015 | Hatakeyama | B60L 1/003 165/42 |
| 2015/0267801 A1* | 9/2015 | Bidner | F16H 57/0417 701/2 |
| 2016/0074525 A1* | 3/2016 | Colletti | C12N 15/111 530/322 |
| 2016/0107503 A1* | 4/2016 | Johnston | B60H 1/00921 165/202 |
| 2016/0107505 A1* | 4/2016 | Johnston | B60H 1/00385 165/202 |
| 2016/0107506 A1* | 4/2016 | Johnston | B60H 1/00921 165/202 |
| 2016/0107507 A1* | 4/2016 | Johnston | B60H 1/00278 62/160 |
| 2016/0107508 A1* | 4/2016 | Johnston | B60H 1/00278 165/202 |
| 2016/0207417 A1* | 7/2016 | Gauthier | B60L 11/1874 |
| 2016/0339760 A1* | 11/2016 | Dunn | B60H 1/00278 |
| 2016/0351981 A1* | 12/2016 | Porras | H01M 10/6569 |
| 2017/0008407 A1* | 1/2017 | Porras | B60H 1/00278 |
| 2017/0087957 A1* | 3/2017 | Blatchley | B60H 1/00392 |
| 2017/0088006 A1* | 3/2017 | Blatchley | B60H 1/00278 |
| 2017/0110775 A1* | 4/2017 | Smith | H01M 10/6567 |
| 2017/0313158 A1* | 11/2017 | Porras | H01M 10/6568 |
| 2017/0317393 A1* | 11/2017 | Blatchley | H01M 10/625 |
| 2017/0358833 A1* | 12/2017 | Jalilevand | H01M 10/613 |
| 2018/0079280 A1* | 3/2018 | Leone | B60L 50/15 |
| 2018/0162213 A1* | 6/2018 | Colavincenzo | B60K 6/387 |

\* cited by examiner

Load = Funct (Air Temp, Blower Speed)

| Blower Speed (%) | Ambient Air Temperature (DegC) | | | | | | | |
|---|---|---|---|---|---|---|---|---|
| | 10 | 15 | 20 | 25 | 30 | 35 | 40 | 45 |
| 0 | 0 | 0 | 10 | 20 | 25 | 30 | 40 | 45 |
| 10 | 0 | 10 | 10 | 20 | 25 | 30 | 40 | 45 |
| 20 | 10 | 10 | 15 | 20 | 30 | 35 | 40 | 50 |
| 30 | 15 | 20 | 25 | 30 | 35 | 40 | 50 | 55 |
| 40 | 25 | 20 | 30 | 45 | 50 | 55 | 60 | 65 |
| 50 | 20 | 30 | 40 | 50 | 50 | 55 | 60 | 65 |
| 60 | 30 | 30 | 40 | 50 | 60 | 65 | 70 | 75 |
| 70 | 30 | 40 | 50 | 60 | 65 | 75 | 80 | 80 |
| 80 | 35 | 40 | 50 | 60 | 70 | 80 | 90 | 90 |
| 90 | 40 | 50 | 60 | 70 | 80 | 90 | 95 | 100 |
| 100 | 45 | 50 | 60 | 70 | 80 | 90 | 100 | 100 |

METHOD TO CONTROL BATTERY COOLING USING THE BATTERY COOLANT PUMP IN ELECTRIFIED VEHICLES

TECHNICAL FIELD

The present disclosure relates to a control strategy and method for operating an evaporator associated with an air-conditioning system of a vehicle.

BACKGROUND

The need to reduce fuel consumption and emissions in automobiles and other vehicles is well known. Vehicles are being developed that reduce reliance or completely eliminate reliance on internal-combustion engines. Electric and hybrid vehicles are one type of vehicle currently being developed for this purpose. Electric and hybrid vehicles include a traction motor that is powered by a traction battery. Traction batteries require a thermal-management system to thermally regulate the temperature of the battery cells. Such thermal-management systems may also be utilized to cool the vehicle's cabin.

SUMMARY

A first illustrative embodiment discloses a climate-control system for a vehicle, comprising a controller in communication with a chiller configured to cool a vehicle battery and an evaporator configured to cool a vehicle cabin. The controller is configured to output a target chiller-pump speed based upon a difference between a battery coolant temperature and a target-battery coolant temperature to mitigate a temperature swing of air entering the cabin, and limiting the target chiller-pump speed in response to an available capacity of the chiller.

A second illustrative embodiment discloses a climate-control system for a vehicle, comprising a chiller utilized to cool a battery in the vehicle, an evaporator utilized to cool a cabin in the vehicle, and a vehicle controller. The vehicle controller is in communication with the chiller and evaporator, and configured to generate for output a target chiller-pump speed of the chiller that corresponds to a difference between a temperature of the battery and a target temperature of the battery to mitigate a temperature swing of air entering the cabin.

A third illustrative embodiment discloses a method of climate control in a vehicle, comprising cooling a battery and cabin of a vehicle at a target chiller-pump speed of a chiller, the target speed corresponding to a difference between a temperature of an battery and a target temperature of the battery, and wherein the target pump speed does not exceed a limit defined by a look-up table that identifies a capacity of the chiller by mapping the load and the difference.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
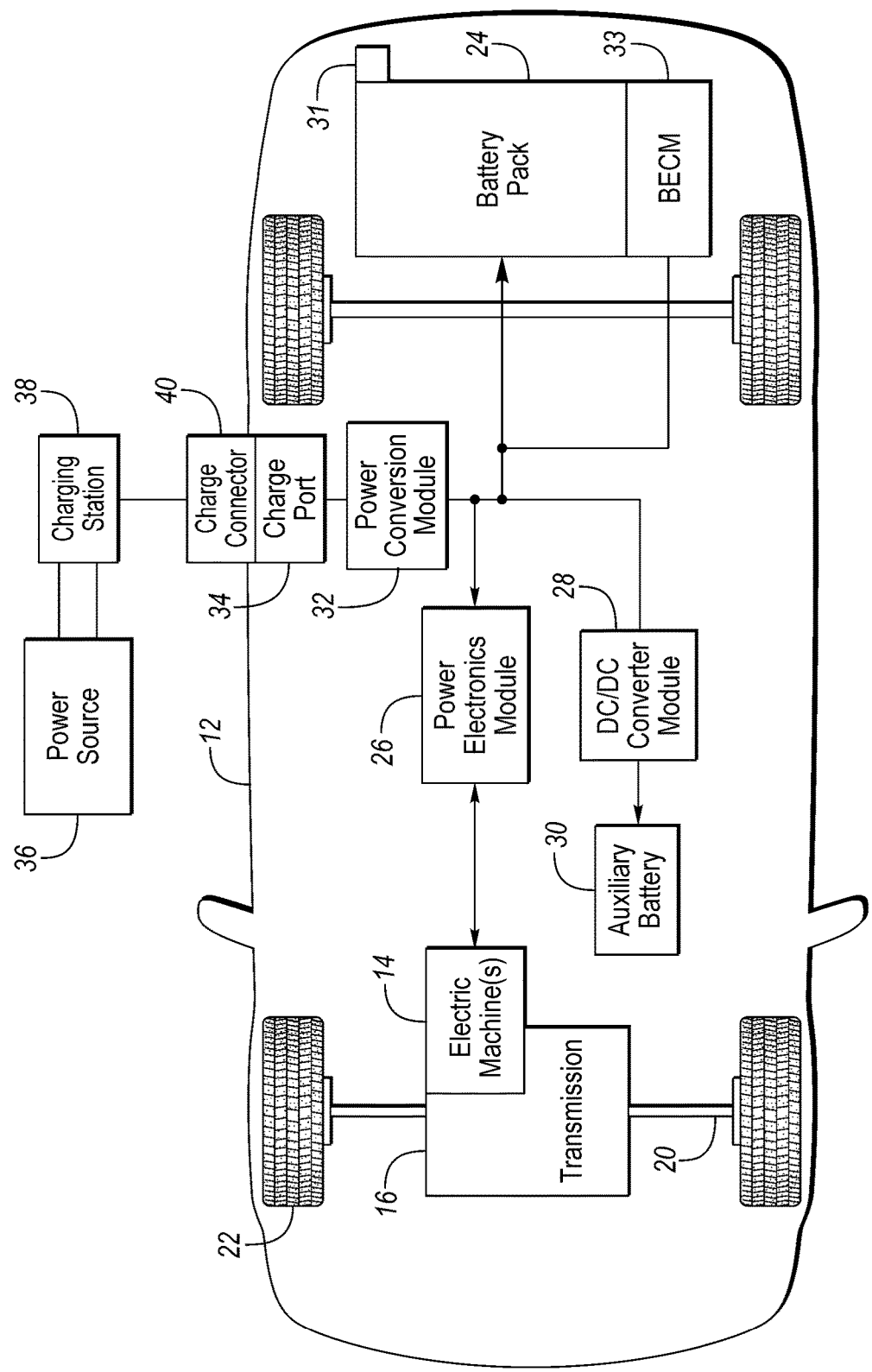
FIG. 1 is a schematic diagram of an example electric vehicle.

FIG. 1 depicts a schematic of an example battery-electric vehicle (BEV). Certain embodiments, however, may also be implemented within the context of hybrid-electric vehicles. The vehicle 12 includes one or more electric machines 14 mechanically connected to a transmission 16. The electric machines 14 may be capable of operating as a motor or a generator. If the vehicle is a hybrid-electric vehicle, the transmission 16 is mechanically connected to an engine (not shown). The transmission 16 is mechanically connected to the wheels 22 via a driveshaft 20. The electric machines 14 can provide propulsion and deceleration capability. The electric machines 14 also act as generators and can provide fuel economy benefits by recovering energy through regenerative braking.

A traction battery or battery pack 24 stores energy that can be used by the electric machines 14. The traction battery 24 typically provides a high-voltage direct current (DC) output from one or more battery cell arrays, sometimes referred to as battery cell stacks, within the traction battery 24. The battery cell arrays may include one or more battery cells.

The battery cells (such as a prismatic, pouch, cylindrical, or any other type of cell), convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. Sensors may be utilized to determine a temperature of the various battery cells.

Different battery pack configurations are available to address individual vehicle variables including packaging constraints and power requirements. The battery cells may be thermally regulated with a thermal management system. Examples of thermal management systems include air-cooling systems, liquid-cooling systems, and a combination of air and liquid systems.

The traction battery 24 may be electrically connected to one or more power electronics modules 26 through one or more contactors (not shown). The one or more contactors isolate the traction battery 24 from other components when opened, and connect the traction battery 24 to other components when closed. The power-electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power-electronics module 26 may convert the DC voltage to a three-phase AC voltage as required by the electric machines 14. In a regenerative mode, the power-electronics module 26 may convert the three-phase AC voltage from the electric machines 14 acting as generators to the DC voltage required by the traction battery 24.

In addition to providing energy for propulsion, the traction battery 24 may provide energy for other vehicle electrical systems. A typical system may include a DC/DC converter 28 that converts the high-voltage DC output of the traction battery 24 to a low-voltage DC supply that is compatible with other vehicle components. Other high-voltage loads, such as air-conditioning compressors and electric heaters, may be connected directly to the high-voltage supply without the use of a DC/DC converter module 28. In a typical vehicle, the low-voltage systems are electrically connected to the DC/DC converter and an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and state of charge for each of the battery cells. The traction battery 24 may have a temperature sensor 31 such as a thermistor or other temperature gauge. The temperature sensor 31 may be in communication with the BECM 33 to provide temperature data regarding the traction battery 24. The BECM 33 may be part of a larger vehicle-control system that includes one or more additional controllers.

The vehicle 12 may be recharged by an external power source 36. The external power source 36 may be a connection to an electrical outlet connected to the power grid or may be a local power source (e.g. solar power). The external power source 36 is electrically connected to a vehicle charging station 38. The charger 38 may provide circuitry and controls to regulate and manage the transfer of electrical energy between the power source 36 and the vehicle 12. The external power source 36 may provide DC or AC power to the charger 38. The charger 38 may have a charge connector 40 for plugging into a charge port 34 of the vehicle 12. The charge port 34 may be any type of port configured to transfer power from the charger 38 to the vehicle 12. The charge port 34 may be electrically connected to a charger or on-board power-conversion module 32. The power-conversion module 32 may condition the power supplied from the charger 38 to provide the proper voltage and current levels to the traction battery 24. The power-conversion module 32 may interface with the charger 38 to coordinate the delivery of power to the vehicle 12. The charger connector 40 may have pins that mate with corresponding recesses of the charge port 34. In other embodiments, the charging station may be an induction charging station. Here, the vehicle may include a receiver that communicates with a transmitter of the charging station to wirelessly receive electric current.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

Figure 2:
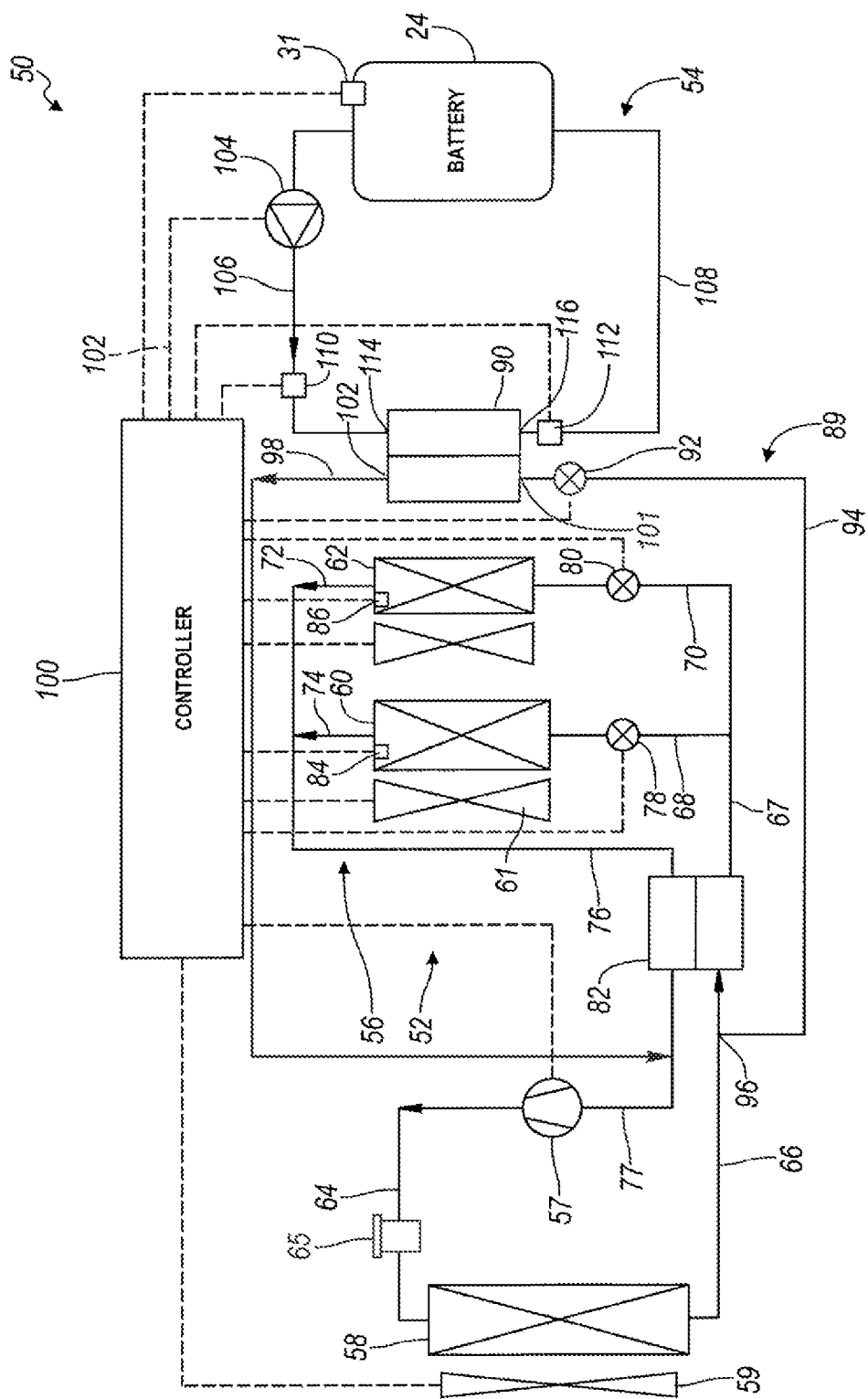
FIG. 2 is a schematic diagram of a climate-control system of a vehicle.

The traction battery 24, the passenger cabin, and other vehicle components are thermally regulated with one or more thermal-management systems. Example thermal-management systems are shown in the figures and described below. Referring to FIG. 2, the vehicle 12 includes a climate-control system 50 having at least a refrigerant subsystem 52 and battery-coolant subsystem 54. Portions of the various thermal-management systems may be located within various areas of the vehicle, such as the engine compartment and the cabin, for example.

The refrigerant subsystem 52 provides air conditioning of the cabin during some operating modes, and also cools the battery 24 during some operating modes. The refrigerant subsystem 52 may be a vapor-compression heat pump that circulates a refrigerant transferring thermal energy to various components of the climate-control system 50. The refrigerant subsystem 52 may include a cabin loop 56 having a compressor 57, an exterior heat exchanger 58 (e.g., condenser), a first interior heat exchanger 60 (e.g., front evaporator), a second interior heat exchanger 62 (e.g., rear evaporator), an accumulator, fittings, valves, expansion devices and other components commonly associated with refrigerant subsystems. The evaporators may each have an associated blower 61. The condenser 58 may be located behind the grille near the front of the vehicle, and the evaporators may be disposed within one or more HVAC housings. It is to be understood that heat exchangers labeled as "condenser" may also act as an evaporator if the refrigerant subsystem 52 is a heat pump. A fan 59 may circulate air over the condenser 58. A high-side-pressure transducer 65 may be located between the A/C compressor and the condenser in conduit 64.

The cabin loop 56 components are connected in a closed loop by a plurality of conduits, tubes, hoses or lines. For example, a first conduit 64 connects the compressor 57 and the condenser 58 in fluid communication, a second conduit 66 connects the condenser 58 to the intermediate heat exchanger 82, and conduit 67 connects the evaporators 60 and 62 in fluid communication with the heat exchanger 82. The front evaporator 60 is connected with conduit 67 via conduit 68, and the rear evaporator 62 is connected with conduit 67 via conduit 70. A first expansion device 78 is disposed on conduit 68 and controls refrigerant flow to the front evaporator 60. The expansion device is configured to change the pressure and temperature of the refrigerant in the subsystem 52. The expansion device 78 may be a thermal expansion valve with an electronically controllable shut-off feature or may be an electronic expansion valve. A second expansion device 80 is disposed on conduit 70 and controls refrigerant flow to the rear evaporator 62. The second expansion device 80 may be similar to the first expansion device. The front evaporator 60 is connected to a return conduit 76 via conduit 74, and the rear evaporator 62 is connected with return conduit 76 via conduit 72. The return conduit 76 connects between the heat exchanger 82 and the evaporators. Conduit 77 connects between the heat exchanger 82 and the compressor 57. The intermediate heat exchanger 82 is optional.

The climate-control system 50 includes a controller 100 in electronic communication with several of the climate-control components. The dashed lines in FIG. 2 illustrate electrical connections between the controller 100 and the components. The controller may interface with the various components via a data bus or dedicated wires as described above. The evaporators 60 and 62 each include a temperature sensor 84 and 86, respectively, that is configured to send a signal indicating the temperature of the corresponding evaporator to the controller 100. Using these temperature signals, and other signals, the controller 100 can determine the operating conditions of the climate-control system 50.

The refrigerant subsystem 52 also includes a chiller refrigerant line 89 having a chiller 90 and a third expansion device 92. The chiller refrigerant line 89 may include a supply conduit 94 connected to conduit 66 at fitting 96 and connected to the refrigerant-inlet side 101 of the chiller 90. The third expansion device 92 may be similar to the first expansion device 78 described above. A return conduit 98 may be connected to the battery chiller 90 and to return conduit 77. The return conduit 98 is connected to the refrigerant-outlet side 102 of the chiller at one end and is connect with conduit 77 at the other end. Optionally, the return conduit 98 may be connected to the battery chiller 90 and to the cabin loop 56 via conduit 76, which is not shown in FIG. 2.

The vehicle also includes a battery thermal-management system that operates in a plurality of different modes, such as battery-heating mode or battery-cooling mode. The battery thermal-management system includes a battery-coolant subsystem 54 (shown) that dissipates heat to the refrigerant subsystem 52 via the chiller 90, and a radiator loop (not shown) that dissipates heat to the ambient air via a radiator. These two loops may operate in tandem or independently of each other depending upon the battery cooling requirements, the ambient air temperature, and other factors.

The battery-coolant subsystem 54 connects the traction battery 24 or (a battery cold plate) and the chiller 90 in fluid communication. The subsystem 54 includes a chiller pump 104 disposed on a first conduit 106 that connects between the battery 24 and the coolant-inlet side 114 of the chiller 90. A second conduit 108 connects between the coolant-outlet side 116 and the battery 24.

A coolant inlet temperature sensor 110 is disposed on conduit 106 near the inlet side 114. The sensor 110 is configured to output a signal to the controller 100 indicating a temperature of the coolant circulating into the chiller 90. A coolant outlet temperature sensor 112 is disposed on conduit 108 near the outlet side 116. The sensor 112 is configured to output a signal to the controller 100 indicating a temperature of the coolant exiting the chiller 90 and entering the battery 24.

The battery chiller 90 may have any suitable configuration. For example, the chiller 90 may have a plate-fin, tube-fin, or tube-and-shell configuration that facilitates the transfer of thermal energy without mixing the heat-transfer fluids in the coolant subsystem 54 and the refrigerant subsystem 52.

In systems in which the battery chiller is in fluid communication with a cabin AC system (such as refrigerant subsystem 52), a potential for negatively affecting the temperature of the cabin air is possible if the AC system does not have enough capacity to cool both the cabin and the battery at their respective loads. For example, on a hot day, simultaneously cooling the battery and the passenger cabin via the AC system may cause the outlet temperature of the cabin evaporator to increase beyond a target temperature, which causes the air blowing into the cabin to be warmer than that requested by the driver. The occupants of the cabin may find it dissatisfying when the cabin temperature is not conforming with the demanded temperature. As such, the vehicle may be required to choose between satisfying cabin demands versus satisfying battery demands in situations in which the combined load exceeds the capacity.

In one embodiment, the system may be designed to balance the cabin demand and the battery demand. Based upon the conditions of the AC system 52, the pump 104 speed and therefore coolant flow through the chiller may be controlled to meet demands of first the cabin while managing the left over AC capacity for the battery chiller. Additionally, the controller may be configured to determine a capacity (e.g. "chiller capacity"), of the refrigerant system to accept additional heat and based on the chiller capacity, route an appropriate amount of coolant to the chiller and therefore increasing the refrigerant through the chiller 90 in order to provide that capacity. In the illustrated embodiment, the chiller pump 104 speed translates to coolant flow through the chiller and may be used to control the percentage of refrigerant flowing to the chiller 90 versus the percentage of refrigerant bypassing the chiller via conduits 68 or 70. Depending upon the conditions of the cabin AC system 52, the pump speed may controlled to send between zero and 100 percent of the coolant to the chiller. Additionally in another embodiment, if no chiller capacity is available, the battery-coolant system may attempt to cool the battery using a radiator in conjunction with a fan. In some instances, the radiator and fan may be unable to achieve a sufficiently low battery coolant temperature for a given battery load. To prevent overheating, the controller may power limit the battery to prevent overheating.

Control logic or functions performed by controller 100 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 100. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 3:
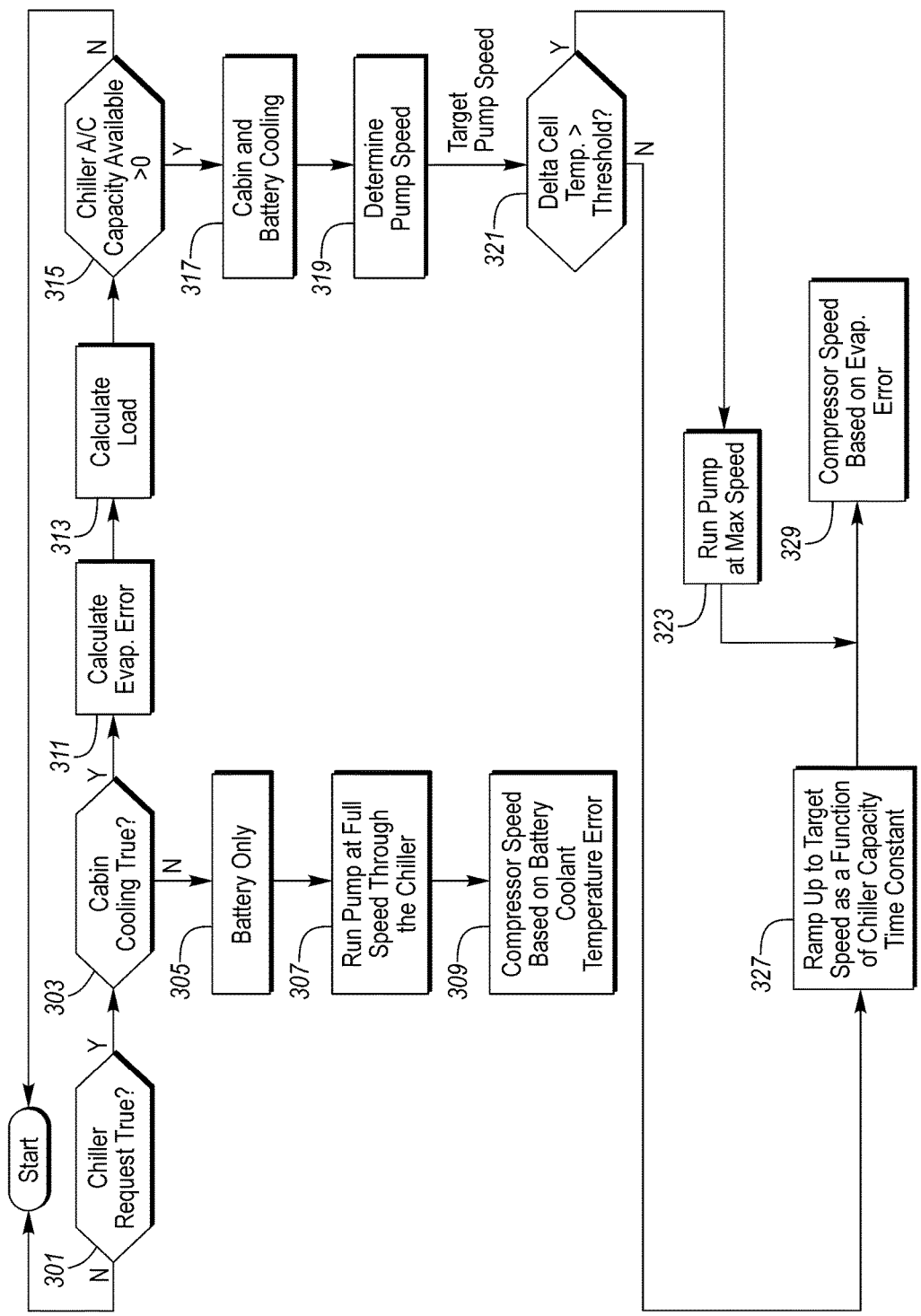
FIG. 3 is a flow chart illustrating logic for controlling an air conditioning system.

FIG. 3 is a flow chart 300 illustrating logic for controlling an air conditioning system. The controller may first begin by determining whether an incoming request for the chiller has been received at 301. If the chiller has not been requested, there may be no need to determine the chiller capacity and the pump speed is determined based on the battery needs and battery cooling loop. However, if the chiller has been requested, it may be required to determine if the cabin is also being cooled at 303.

In the scenario that the cabin is not being cooled, the battery may be a component that needs to be cooled at 305. The battery may be cooled by utilizing the chiller of the battery-coolant system. As such, the pump may be run at full speed through the chiller at step 307. As such, the compressor speed may be defined in response to the battery coolant temperature error at 309. The battery coolant temperature error may be the difference between the target battery inlet coolant temperature and the actual battery inlet coolant temperature. Such a difference may be utilized when the chiller is in use to determine if the battery cooling needs are met, and the cabin is not being cooled (e.g. by the evaporator). The compressor speed may be determined utilizing a proportion integration (PI) controller that utilizes the difference between the target battery inlet coolant temperature and the actual battery inlet coolant temperature.

In a scenario when the cabin is being cooled, a controller may determine the evaporator error by calculating the difference between the target evaporator temperature and the actual evaporator temperature at step 311. The controller may calculate a target evaporator temperature by utilizing various inputs, such as the cabin set point (e.g. temperature set point set by the customer), the cabin temperature, the ambient temperature, the solar load, and other operating conditions.

Figures 5A, 5B:
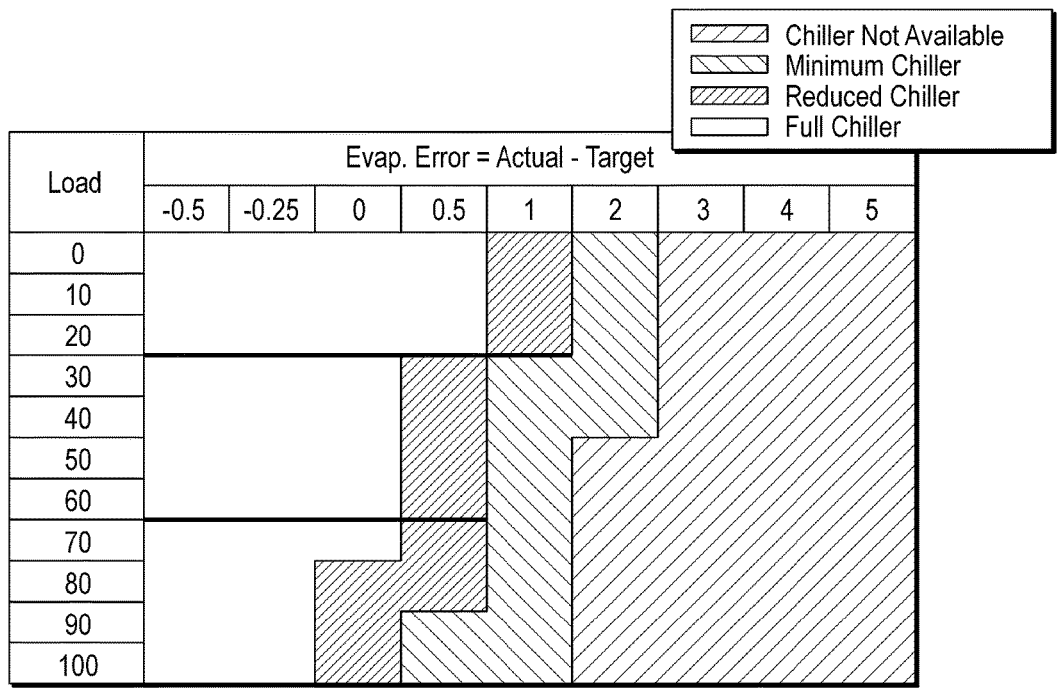
FIG. 5A is an exemplary chart that diagrams the chiller load as a function of the blower speed and ambient air temperature
FIG. 5B is an exemplary chart that diagrams chiller availability as a function of the chiller load and the evaporator error.

At step 313, a controller may determine the cabin thermal load, for example, utilizing the table mapped in FIG. 5A. As described below, the cabin thermal load is a function of the blower speed and the ambient-air temperature. The controller may be configured to determine a total capacity of the AC system, the amount of the total capacity being used by the cabin evaporator (which may be called evaporator capacity), and a chiller capacity that is available to the chiller if needed. The chiller capacity is the reserve capacity of the refrigerant system to accept additional heat from the chiller. The chiller capacity may be equal to the total system capacity minus the evaporator capacity. The controller may be programmed to determine the chiller capacity as a function of the cabin thermal load, and a temperature differential between a target evaporator temperature and a measured evaporator temperature. The target temperature of an evaporator is based on the cabin temperature requested by the driver, ambient-air temperature, sun load, and climate-control mode.

For example, if the driver requests a 21 degrees Celsius cabin temperature, the controller may include mapping indicating a target evaporator temperature of 2-9 degrees Celsius range with 6 degrees being a typical target evaporator value. The cabin thermal load is a function of the temperature of the ambient air and the speed of the cabin blower that circulates air over the evaporator. An example high load occurs when the blower is on HIGH and the ambient air is above 30 degrees Celsius, and an example low load occurs when the blower is on LOW and the ambient air is below 20 degrees Celsius. The thermal load could also take into account ambient air temperature, sun load, cabin temperature set point, sun load, and the number of vehicle occupants. Ambient air temperature may reference the intake air temperature into the HVAC system. Additionally, this intake air could be directly from outside the vehicle, or ambient air, or from the cabin in a full recirculation setting, partial recirculation setting, or a combination of both. In an alternative embodiment, the thermal load may take into account a temperature from an inlet air temperature sensor.

At step 315, the air conditioning's capacity available to the chiller may be determined. The air condition's chiller availability may be determined utilizing a look-up table that maps the chiller capacity as a function of the cabin thermal load and the evaporator error. The chiller air conditioning capacity may be a function between the cabin thermal load calculated at step 313 and the evaporator error calculated at 311. The controller may also determine if the chiller capacity is greater than zero. If the chiller capacity is zero, the chiller may not be used to cool the battery. As such, the control loops back to the start. If the chiller capacity is greater than zero, control passes to operation 317 and the controller translates the chiller capacity to a maximum pump speed. The controller may begin to cool the cabin and battery at step 317. The controller may initially calculate the pump speed at step 319, and output the target pump speed. The pump speed may be calculated utilizing factors such as the battery coolant temperature and the target battery coolant temperature. Furthermore, a limit may be set on the maximum pump speed based on the capacity of the chiller. As described in additional detail with respect to FIG. 4, the target pump speed may be determined utilizing several factors.

At operation 321, a controller may determine the temperature of the individual cells in a battery. Sensors within the battery may be utilized to determine the temperature of each battery cell and those sensors may be in communication with one or more controllers. Each cells individual temperature may be utilized to determine the change in temperature across cells in the battery. The controller may be programmed to include a defined threshold to determine a change in temperature. The controller may be utilized to determine if a change between battery cell temperatures falls above the threshold value. A temperature change between battery cells may grow apart and the gradient temperature of the battery may grow too large. Such an increase in the battery cell temperature may require full coolant flow to coolof the battery to avoid temperature swings. This may require the vehicle's thermal management system to prioritize cooling the battery, as opposed to a steady ramp up of the battery cooling to prevent discharge air temperature swings to the cabin. If the battery temperature is homogeneous or cell to cell temps are below the threshold, then the vehicle's thermal management system may ramp-up cooling efforts to the battery. This may be beneficial to avoid large temperature swings to the cabin. If the change in the battery's cell temperature is above a threshold, the pump can run at a maximum speed at operation 323 or at a maximum speed as defined by the capacity of the chiller. This logic may prevent large gradients of the battery to promote durability of the battery.

At operation 327, the controller may utilize a look-up table to ramp up the target speed of the pump as a function of the chiller capacity over time. The look-up table may be defined in a manner to mitigate temperature swings of cooling efforts in the cabin. The ramp-up speed may be allocated over time as a function of coolant temperature measured by a sensor in the chiller inlet sensor 110. In another embodiment, the ramp-up speed may be over time as a function of coolant temperature measured by sensor 112 with an offset if the chiller inlet sensor 112 is unavailable. This may help mitigate influence on the cabin air swings at a set pump ramp rate. For instance, the pump flow rate may be defined to manage capacity of the chiller to allow the refrigerant system to respond to temperature demands between the battery and cabin. In other words, the pump speed ramp rate or speed at which the pump will go from zero to the target speed is a function of how hot the coolant temperature is. For example, if the coolant is at 50 degrees Celsius, the pump may take ten seconds to reach the target speed. But if the coolant is at 30 degrees Celsius then the pump may take five seconds to reach the target speed.

At operation 329, the compressor speed may be defined in response to calculating the difference between the target evaporator temperature and the actual evaporator temperature. The evaporator error or the difference between evap. target and actual is at its maximum when the cabin is first requested to cool, and the overall cabin cool down may by extended if the chiller is also running. The compressor speed may be determined utilizing a proportion integration (PI) controller that utilizes the difference between the target evaporator temperature and the actual evaporator temperature when the cabin is requested in either a "cabin only" circumstance or when the cabin and chiller are simultaneously running. The compressor speed PI controller in chiller only mode is determined based on battery coolant error which is the difference between battery chiller target and actual battery coolant temperature as measure by sensor 112. Additionally, the refrigerant valves 78, 80, and 92 are actuated to open or close depending on the mode. For example, the controller may open valves 78 or 80 when the front or rear cabin are on and close 92 if the chiller is not requested. The controller may open 92 when the chiller is running. Also during a chiller only mode, valves 78 and 80 may be closed, while shutoff and expansion valve 92 may be open to allow refrigerant flow to the chiller. Chiller only controls may run the chiller pump 104 at full speed and the compressor speed is determined based on battery coolant error. When the cabin is also running, the battery or chiller capacity may be controlled using the chiller pump 104.

Figure 4:
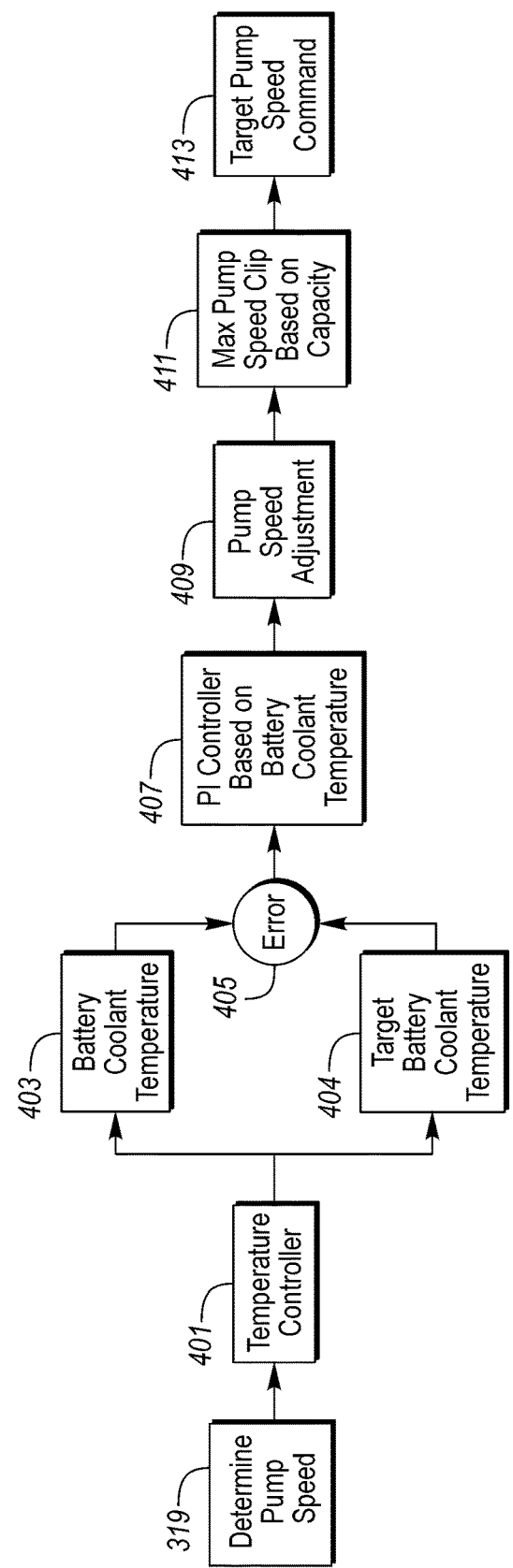
FIG. 4 is flow chart illustrating logic for controlling a pump speed in an air conditioning system.

FIG. 4 shows a flow chart illustrating logic for controlling a chiller pump 104 speed in an air conditioning system. At operation 401, the battery temperature controller may receive information from sensors to determine a temperature of the battery coolant at operation 403. Additionally, the controller may also define a target battery coolant temperature at operation 404 based on a look-up table defining an ideal temperature for the battery coolant to be at in order for the air conditioning system to cool both the cabin and the battery. At operation 405, the controller may define an error by determining the difference between the actual temperature and the target temperature of the battery coolant temperature.

At operation 407, a PI controller may receive the error for the battery coolant temperature. At operation 409, the PI controller may utilize the error to generate for output an ideal pump speed or adjust the pump speed. A look-up table or the like may be utilized to map the pump speed adjustment to the error of the battery coolant temperature. While a pump speed may be desired, it may not always be possible or beneficial to utilize that pump speed based on the capacity of the chiller. At operation 411, the maximum pump speed may be adjusted or lowered based on the capacity of the chiller, and a controller may define a clip or limit to set the pump speed based on the capacity of the chiller.

While settings may be determined by various capacity levels of the chiller, in one embodiment the capacity may have several different settings. The settings may be utilized to translate chiller capacity to a pump speed. For example, chiller capacities categorized as "one" may correspond to a pump speed that routes 25% of the coolant to the chiller. In another example, if the chiller capacity is defined at a minimum level (e.g. level "one"), the coolant pump may be run at approximately 25% of the ideal speed. In another example, if the chiller capacity is defined at a reduced level (e.g. level "two"), which may be greater than the minimum level, but less than full, the coolant pump may be run at approximately 50% of the ideal speed. In another embodiment, if the chiller capacity is full, or at a level above the reduced level, the chiller capacity may be more than enough to cool the battery and routing too much coolant through the chiller may overcool the battery. Thus, the temperature controller will take over and the max clip on box 411 will not be used but the temperature controller will define and ideal pump speed to match the battery needs. The coolant pump speed may be controlled based on a difference between a target battery inlet coolant temperature and a measured battery inlet coolant temperature. Such pump speed and settings are merely examples and are not limiting.

FIG. 5A is an exemplary chart that diagrams the cabin load as a function of the blower speed and ambient air temperature. While the following chart is exemplary, the chart demonstrates that the cabin load may vary as the blower speed percentage differs in comparison to the ambient air temperature. For example, as blower speed temperature increases and ambient air temperature increases, the cabin load value may increase. The load table may be stored in memory of the controller. The controller may include one or more load tables that are selectively used during different operating conditions. In the table, the load increases with increasing air temperatures and with increasing blower speeds. The blower speed may be represented as a percentage.

FIG. 5B is an exemplary chart that diagrams chiller availability as a function of the cabin load and the cabin evaporator error (e.g. the difference between the actual evaporator temperature and the target evaporator temperature). As shown by FIG. 5B, the load and evaporator error may have an impact as to the capacity of the chiller. In one example, the chiller may not be available if the evaporator error is at over 3 degrees C. In another example, the chiller may need to operate at a minimum chiller and therefore minimum pump speed dependent on the evaporator error, 2 degrees C., at different cabin loads. The chiller may also be full as shown on the left-hand side of the graph, for example, when the evaporator error is 0.5. Finally, the chiller may be reduced in another scenario. While the graph contemplates four scenarios/settings for the chiller, there may be additional or reduced scenarios/settings that may be defined as a function of the load and evaporator error. For instance, if the evaporator error is equal to zero, the cabin may be cooled. If the evaporator error is large (e.g. greater evaporator than three degrees), the cabin may not be cooled at the desired rate, or the discharge of air temperatures may be high. The air discharge that flows into the cabin may be directly proportional to the temperature on the evaporator. Thus any evaporator temperature swings may lead to cabin discharge air temperature swings. Thus, ideally it may be beneficial to provide capacity to the chiller when the evaporator error is close to zero or below zero. As the evaporator error grows positive, the chiller capacity may need to be reduced so that the air discharged into the cabin is not raised.

What is claimed is:

1. A climate-control system for a vehicle, comprising:

a controller in communication with a chiller configured to cool a vehicle battery and an evaporator configured to cool a vehicle cabin, the controller configured to output a target chiller pump speed based upon a difference between a battery coolant temperature and a target-battery coolant temperature to mitigate a temperature swing of air entering the cabin, and limiting the target chiller-pump speed in response to an available capacity of the chiller wherein the pump speed is adjusted in response to the capacity of the chiller; and wherein the capacity of the chiller is defined utilizing a look-up table mapping a cabin thermal load of the vehicle and a difference between an evaporator temperature and a target evaporator temperature.

2. The climate-control system of claim 1, wherein the pump speed is determined such that coolant is increased in circulation to a chiller outlet as capacity of the chiller increases.

3. The climate-control system of claim 2, wherein the pump speed includes a first speed configured to output coolant at a first speed in response to the capacity of the chiller being full.

4. The climate-control system of claim 2, wherein the pump speed includes a second speed configured to output coolant at a second speed being lower than a first speed in response to the chiller capacity being less than full.

5. The climate-control system of claim 1, wherein the controller is further configured to determine a change in temperature of cells in the vehicle battery.

6. The climate-control system of claim 5, wherein the controller is further configured to define a target pump speed in response to the change in temperature of cells in the vehicle battery being below a temperature gradient threshold value defining a temperature gradient in the vehicle battery.

7. The climate-control system of claim 5, wherein the controller is further configured to output a maximum target speed in response to the change in temperature of cells in the vehicle battery being above a temperature gradient value defining a temperature gradient in the vehicle battery.

* * * * *